United States Patent [19]

Marggrander et al.

[11] Patent Number: 5,000,977
[45] Date of Patent: Mar. 19, 1991

[54] METHOD FOR REDUCING THE SALT CONTENT IN A FOODSTUFF

[75] Inventors: Kurt Marggrander, Eberbach-Igelsbach; Peter Koepff, Heidelberg; Klaus Bräumer, Eberbach, all of Fed. Rep. of Germany

[73] Assignee: Deutsche Gelatine-Fabriken Stoess & Co. GmbH, Eberbach, Fed. Rep. of Germany

[21] Appl. No.: 316,548

[22] Filed: Feb. 24, 1989

Related U.S. Application Data

[63] Continuation of Ser. No. 58,346, Jun. 5, 1987, abandoned.

[30] Foreign Application Priority Data

Jun. 14, 1986 [DE] Fed. Rep. of Germany ....... 3620150

[51] Int. Cl.$^5$ ............................ A23L 1/237; A23J 3/06
[52] U.S. Cl. .................................. 426/649; 426/576; 426/657
[58] Field of Search .................. 426/649, 657, 576

[56] References Cited

U.S. PATENT DOCUMENTS 3,743,514  7/1973  Olson et al. .................. 426/646
4,451,494  5/1984  Roan, III ...................... 426/84

FOREIGN PATENT DOCUMENTS 2537618  2/1977  Fed. Rep. of Germany ...... 426/657

*Primary Examiner*—Donald E. Czaja
*Assistant Examiner*—Helen Pratt
*Attorney, Agent, or Firm*—Kramer, Brufsky & Cifelli

[57] ABSTRACT

In a foodstuff, the salt content present as such therein and imparting the flavor thereto is reduced by up to 50% by weight, without noticeable detriment to the flavor, by adding collagen hydrolysate.

5 Claims, No Drawings

METHOD FOR REDUCING THE SALT CONTENT IN A FOODSTUFF

This application is a continuation of application Ser. No. 058,346, filed June 5, 1987 now abandoned.

The invention relates, in general, to the preparation of food with a low salt content. In particular, the invention concerns a method for reducing the salt content in a foodstuff and to a foodstuff produced by such a method having a salt content and a flavor imparted to it by the salt. Finally, the invention refers generally to the use of collagen hydrolysate as salt substitute in food.

Salt (sodium chloride) is an essential ingredient in practically all food for human consumption and, apart from its nutritional and physiological importance, above all, gives the food in question its pleasant taste It is generally known that the salt content in a foodstuff with a certain flavor cannot be reduced beyond a certain extent without losing the characteristic taste and the food being rejected as tasteless.

The regular daily diet of a human being contains approximately 3 to 5 grams salt. This amount is adequate to maintain good health and the physiological activities of the human body Depending on eating habits, salt consumption is, however, often in excess of 10 grams per day.

On the other hand, it is known that excessive salt consumption through food intake can have extremely detrimental effects on the human circulatory system, resulting, above all, in high blood pressure and kidney affections. There is, therefore, an urgent need for a reduction in human salt consumption, not only to cure existing illnesses with a low-salt food diet but also to take preventive measures in healthy human beings.

Numerous attempts have been made to prepare a tasty, low-salt diet which is mostly based on replacing salt by herbs and natural spices. A shortcoming of all of these attempts is that it is practically impossible to replace a considerable amount of the salt by other substances without losing the typical flavor peculiar to salt which gratifies the palate.

The object underlying the invention is to provide low-salt food for human consumption without detriment to the flavor in spite of reduction of the salt content and without any basically discernible difference from food having the corresponding full salt content.

In achieving this object, it was found that it is possible to replace substantial amounts of the salt contained in a foodstuff by collagen hydrolysate. Surprisingly, this causes practically no detriment to the salt-linked flavor even if up to 50% of the salt is replaced by collagen hydrolysate (up to 10% by weight, in relation to the weight of the foodstuff).

There is no full physiological explanation for the fact that replacement of a substantial part of the salt content in a foodstuff by collagen hydrolysate results in practically no loss of flavor in the foodstuff. It is, however, assumed that the described effect is based on the presence of certain amino acids in the collagen hydrolysate which preserve the flavor of the foodstuff.

An inventive method for reducing the salt content in a foodstuff consists in replacing 20 to 50% by weight of the salt content by adding up to 10%, in relation to the weight of the foodstuff, collagen hydrolysate with a molecular weight of less than 50,000 dalton (atomic mass units).

A foodstuff according to the invention containing salt and having a flavor imparted to it by the salt is characterized in that without detriment to the flavor, the salt content is reduced by 10 to 50% by weight by adding up to 10%, in relation to the weight of the foodstuff, collagen hydrolysate with a molecular weight of less than 50,000 dalton (atomic mass units).

In general, the invention also consists in the use of collagen hydrolysate as salt substitute in food, with up bto 50% by weight of the salt in the foodstuff imparting flavor thereto being replaced by up to 10%, in relation to the weight of the foodstuff, collagen hydrolysate with a molecular weight of less than 50,000 dalton (atomic mass units), without any substantial change in taste.

The following description serves, in conjunction with some examples, to explain the invention in greater detail. Similarly to gelatin, collagen hydrolysates of comestible quality can be produced in large quantities at moderate cost. They are obtained from animal connective tissue, e.g., skin, bones or sinews The hydrolysis can be carried out under pressure, by acidic or alkaline action or by enzymes in a-manner known per se. Enzymatically produced collagen hydrolysates are very well suited for use in accordance with the invention. Calves' skin is particularly suitable as starting material for the collagen hydrolysate used in accordance with the invention, although the skin of beef cattle, animal bones, animal sinews and animal connective tissue can also be used with advantage. The best results are obtained with collagen hydrolysates which have a mean molecular weight distribution of less than 50,000 dalton (atomic mass units). Use of a collagen hydrolysate with a mean molecular weight distribution of between 2,000 and 50,000 dalton (atomic mass units) is highly effective, with particularly good results being obtained with values of approximately 15,000 dalton (atomic mass units).

It was ascertained that in the manufacture of comestibles, the salt content can be reduced by 10 to 50% by weight without detriment to taste or aroma if up to 10%, in relation to the weight of the foodstuff, collagen hydrolysate is added. Other protein hydrolysates based, for example, on milk protein or soya protein do not show this effect. It can, therefore, be assumed that a reduction of 40 to 50% of the sodium chloride content is attainable in certain foodstuffs due to the effect of use of collagen hydrolysates. In other comestibles, it may be sufficient to achieve a reduction in the salt content of between 10 and 30, in particular, 10 and 20% by weight.

The inventive suggestion is applicable to a wide range of foodstuffs, in particular, to butcher's produce, ready-to-serve dishes, baker's produce, e.g., bread, and preserved foods.

In the following Examples, the salt content required as such in comestibles and imparting the flavor thereto is replaced by collagen hydrolysate.

EXAMPLE I

Fine liver sausage spread is made from the following ingredients (data in percent by weight):
  15% pigs' liver, minced in advance in the raw state;
  55% matured and boiled pigs' tripe;
  20% matured, boiled pork; and
  10% broth.

The following spices and condiments are added to this mixture per kilogram:
  18 grams salt (nitrite pickling salt);
  5 grams mixed spices;

15 grams steamed onions

In several tests, the indicated quantity of salt (18 grams/kilogram sausage mixture) was reduced and replaced by the addition of certain amounts of collagen hydrolysate A group of 100 people was offered the thus produced sausage samples without any indication as to their composition and was asked to pass judgement on the taste of each sample. Samples containing 16 grams salt and 20 grams collagen hydrolysate were described as particularly good Samples with only 14 grams salt and 30 grams collagen hydrolysate were not distinguished in taste from sausage samples with 18 grams salt and no addition of collagen hydrolysate.

The above stated data in grams mean a salt reduction of 12 and 30 percent by weight, respectively, with a collagen hydrolysate addition of 2 and 3%, respectively, in relation to the weight of the foodstuff.

EXAMPLE II

Ragout fin à la champignon was prepared as ready-to-serve dish (preserved food). The ingredients were (data in percent by weight):

35% veal, lean, sinews removed, boiled;
10% mushrooms, small whole heads;
55% white sauce, consisting of:
    88% veal brew;
    8% additives (flour, margarine, onions, cream);
    2% spices; and
    2% salt.

The following tests were carried out:
1. (Check test)
    2% salt without collagen hydrolysate
2.
    1.6% salt
    2% collagen hydrolysate
    (20% salt reduction)
3.
    1.3% salt
    3% collagen hydrolysate
    (30% salt reduction)
4.
    1% salt
    5% collagen hydrolysate
    (50% salt reduction)

In the above tests, flavor and aroma of the samples were generally described by the tasters as being good and well rounded.

Also, the thickening of the sauce exhibited better stability when collagen hydrolysate was used than in the absence of this substance.

What is claimed is:

1. A method for reducing the sodium chloride content normally added to a foodstuff without substantially changing the flavor normally attained by addition of the sodium chloride, comprising the steps of (1) reducing the sodium chloride content normally added to a foodstuff by about 10–50% by weight and (2) adding collegen hydrolysate exhibiting a molecular weight of less than 50,000 dalton (atomic mass units) in an amount of up to 10% by weight relative to said foodstuff.

2. A method according to claim 1, wherein the collegen hydrolysate is added in an amount of between 1 and 4 percent by weight relative to said foodstuff.

3. A method according to claim 1, wherein the collegen hydrolysate exhibits a molecular weight distribution of between 2,5000 and 50,000 dalton.

4. A method according to claim 1, wherein the sodium chloride is added in an amount that is about 30 to about 50 percent by weight less than said first quantity of sodium chloride.

5. A method according to claim 1, wherein the sodium chloride is added in an amount that is form about 10 to about 20% by weight less than said first quantity of sodium chloride.

* * * * *

UNITED STATES PATENT AND TRADEMARK OFFICE
CERTIFICATE OF CORRECTION

PATENT NO. : 5,000,977
DATED : March 19, 1991
INVENTOR(S) : Kurt Marggrander et al It is certified that error appears in the above-identified patent and that said Letters Patent is hereby corrected as shown below:

In Claim 3, column 4, line 29, delete "2,5000"

and replace with -- 2,500 --.

In Claim 5, column 4, line 35, delete "form"

and replace with -- from --.

Signed and Sealed this

Fifteenth Day of September, 1992

*Attest:*

DOUGLAS B. COMER

*Attesting Officer*      *Acting Commissioner of Patents and Trademarks*